United States Patent
Brooksby et al.

(10) Patent No.: US 8,942,465 B2
(45) Date of Patent: Jan. 27, 2015

(54) METHODS AND SYSTEMS FOR PROCESSING IMAGES FOR INSPECTION OF AN OBJECT

(75) Inventors: Glen William Brooksby, Glenville, NY (US); Paulo Ricardo Dos Santos Mendonca, Clifton Park, NY (US); Shubao Liu, Niskayuna, NY (US); Qi Song, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 374 days.

(21) Appl. No.: 13/323,957

(22) Filed: Dec. 13, 2011

(65) Prior Publication Data

US 2013/0148875 A1 Jun. 13, 2013

(51) Int. Cl.
*G06K 9/00* (2006.01)

(52) U.S. Cl.
USPC ........................................................ 382/152

(58) Field of Classification Search
None
See application file for complete search history.

(56) References Cited

U.S. PATENT DOCUMENTS

| | | |
|---|---|---|
| 2006/0052697 A1 | 3/2006 | Hossack et al. |
| 2008/0092661 A1 | 4/2008 | Howard et al. |
| 2008/0287787 A1 | 11/2008 | Sauer et al. |
| 2009/0060315 A1 | 3/2009 | Harris et al. |
| 2009/0240150 A1 | 9/2009 | Wang et al. |
| 2010/0118137 A1 | 5/2010 | Avila et al. |
| 2011/0182495 A1 | 7/2011 | Sun et al. |
| 2012/0014578 A1* | 1/2012 | Karssemeijer et al. ....... 382/131 |
| 2013/0174412 A1* | 7/2013 | Yu et al. ......................... 29/594 |

FOREIGN PATENT DOCUMENTS

| | | |
|---|---|---|
| EP | 1772824 A2 | 4/2007 |
| EP | 2345992 A2 | 7/2011 |
| EP | 2372392 A1 | 10/2011 |
| JP | 2007199865 A | 8/2007 |

OTHER PUBLICATIONS

Wujie et. al, "Algorithms of Automatic Image Measure System", Information Acquisition, 2006 IEEE International Conference, Print ISBN: 1-4244-0528-9, on pp. 888-893, References Cited: 8, Issue Date : Aug. 20-23, 2006.

Search Report and Written Opinion from corresponding EP Application No. 12195525.6-1906 dated Apr. 22, 2013.

Larre et al., "On the detection of step edges in algorithms based on gradient vector analysis", Image Analysis and Processing, Springer Berlin Heidelberg, Berlin, Heidelberg, pp. 411-416, Sep. 13, 1995.

Xu et al., "Snakes, Shapes and Gradient Vector Flow", IEEE Transactions on Image Processing, IEEE Service Center, Piscataway, NJ, US, vol. 7, No. 3, pp. 359-369, 1998.

\* cited by examiner

*Primary Examiner* — Brian P Werner
(74) *Attorney, Agent, or Firm* — John P. Darling

(57) ABSTRACT

Methods and systems for processing images are provided. One method includes obtaining a plurality of images corresponding to at least one area of an object and performing a rectification of at least some of the plurality of images using a reference structure. The method also includes performing a gradient vector field analysis on the rectified plurality of images of the object to identify anomaly regions within the object.

19 Claims, 7 Drawing Sheets

METHODS AND SYSTEMS FOR PROCESSING IMAGES FOR INSPECTION OF AN OBJECT

BACKGROUND

Different types of testing systems may be used to inspect an object, for example to detect an internal defect (e.g., a crack or wrinkle) within the object, such as a component or part. The testing systems may include non-destructive methods for examining components, such as using ultrasound imaging techniques. As one example, these testing systems may be used to determine whether any defects or flaws exist in the component parts of industrial devices and systems. These defects or flaws, which may be introduced during the original manufacture of the components can reduce the useful life of the components and/or result in failure thereof. Accordingly, these components are typically inspected during the manufacturing process and/or during maintenance to determine whether any defects are present or anomalies exist that are indicative of a defect.

In typical ultrasound inspection systems, images of the internal structure of the components are acquired and displayed to a user. The user then visually inspects the images in an attempt to detect any anomalies. For example, when composite structures form the components, the user may inspect the images showing the multi-layered structure to identify any wrinkles or other defects in the composite material. This visual inspection process is not only tedious and time consuming, but introduces the potential for error, in particular, by the user who has to make the determination of whether an anomaly exists.

BRIEF DESCRIPTION

In one embodiment, a non-transitory computer readable storage medium for identifying anomalies in an object that is imaged using at least one processor is provided. The non-transitory computer readable storage medium includes instructions to command the processor to obtain a plurality of images corresponding to at least one area of an object and perform a rectification of at least one of the plurality of images using a reference structure. The non-transitory computer readable storage medium further includes instructions to command the processor to perform a gradient vector field analysis on the rectified plurality of images of the object to identify anomaly regions within the object.

In another embodiment, an inspection system is provided that includes a processor configured to perform a gradient vector field analysis on a plurality of images of an object to identify anomaly regions within the object. The inspection system also includes a display configured to display at least one of the images with any identified anomaly regions on the displayed image.

In a further embodiment, a method is provided for automatically identifying anomalies in an object that is imaged, wherein the object has an internal membrane. The method includes identifying the membrane in a plurality of images, determining an overall shape of the object, warping the overall shape in the images to straighten the object and computing intensity gradients for the plurality of images. The method also includes determining the local standard deviation of image intensities to identify material types within the object. The method further includes computing and regularizing intensity gradients across a region of interest within the plurality of images to determine a gradient vector field, applying a curl operator to the gradient vector field and thresholding a result of the curl operator to determine any anomaly region. The method further includes applying a region growing process to any anomaly region and generating and displaying an overlay on at least one of the plurality of images identifying any anomaly region.

DETAILED DESCRIPTION

Figure 1:
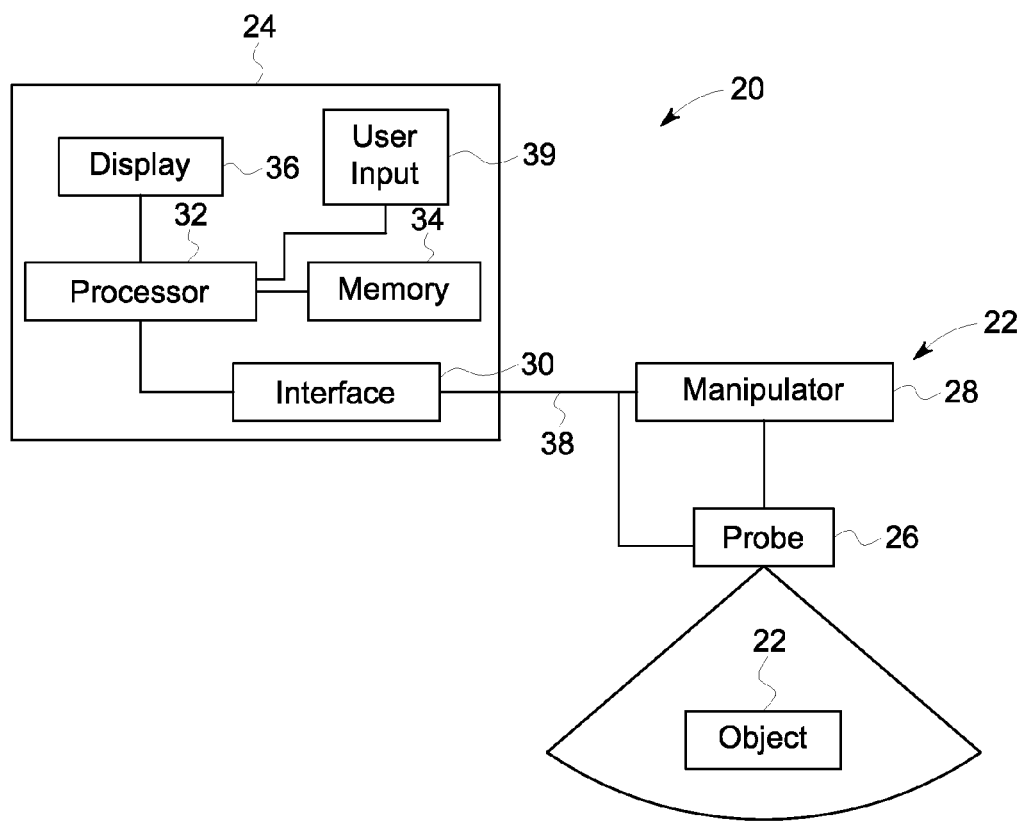
FIG. 1 is a block diagram of an inspection system formed in accordance with one embodiment.

The following detailed description of various embodiments will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

Described herein are various embodiments for identifying anomalies in images of objects under inspection. In particular, various embodiments provide for automatic detection and identification of anomalies in a structure or component using ultrasound images. For example, automatic detection and identification of anomalies in composite structures (e.g., carbon composite structures) may be provided using ultrasound images to inspect the composite structures. It should be noted that although the various embodiments are described in connection with using particular images for inspecting specific components for certain anomalies, the various embodiments may be used with different images (such as non-ultrasound images) and/or parts, and for detecting different anomalies.

At least one technical effect of various embodiments is the automated detection and identification of anomalies using images (e.g., ultrasound images). By practicing various embodiments, increased speed and repeatability in the detection of defects or flaws in components may be provided.

Figure 2:
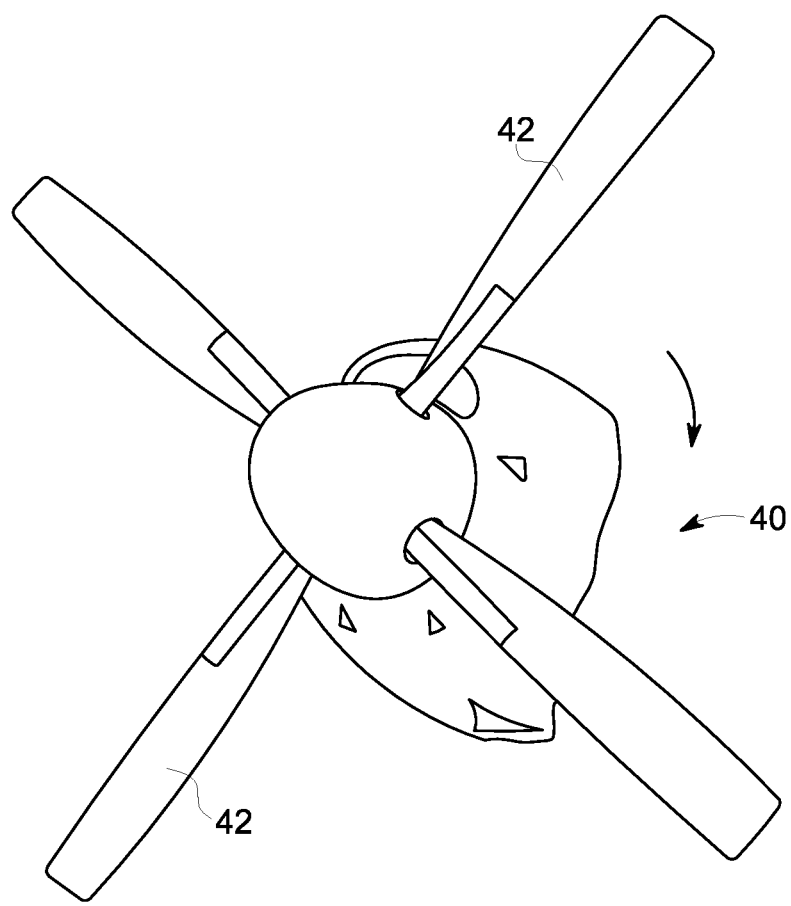
FIG. 2 is a diagram of propeller blades of an aircraft structure having blades that may be inspected in accordance with various embodiments.

FIG. 1 illustrates an inspection system 20 formed in accordance with one embodiment that may be used to inspect an object 22, which may be for example, an industrial composite part or structure, such as an aircraft structure. The aircraft structure may be a portion of an engine 40 (shown in FIG. 2). Accordingly, in one embodiment, the inspection system 20 may be used to inspect one or more propeller blades 42 of an aircraft that are formed from a carbon composite material. The inspection system 20 in one embodiment inspects the blade(s) 42 before assembly into the engine 40, for example, during a propeller blade manufacturing process. It should be noted that other blades may be inspected, for example, of a turbine engine.

Although the various embodiments including the inspection system 20 are described in connection with inspecting an aircraft engine part, the various embodiments may be used to inspect any type of component, which in some embodiments is generally an industrial part or component. Thus, the object 22 may be of any operable shape, size, and configuration. The component may be fabricated of any operable base material such as, but not limited to, carbon composites and/or metal alloys. More specifically, although the various embodiments are described herein with respect to aircraft engine components, it should be appreciated that the various embodiments can be applied to a wide variety of components used within a steam turbine, a nuclear power plant, an automotive engine, or to inspect any mechanical components.

In various embodiments, the inspection system 20 includes an image acquisition portion, which in the illustrated embodiment includes a probe assembly 22, and a data acquisition/control system 24. The probe assembly 22 includes a probe 26, which in the illustrated embodiment is an ultrasound probe and a probe manipulator 28 that is coupled to the probe 26. The probe 26 and probe manipulator 28 are electrically coupled (which may be together or separately) to the data acquisition/control system 24 such that control/data information can be transmitted to and from the probe 26 and manipulator 28 and data acquisition/control system 24. In another embodiment, the inspection system 20 also includes a fixture or holder (not shown) that may be configured to rotate the object 22 during an inspection procedure. It should be noted that any suitable image acquisition device may be used.

The data acquisition/control system 24 includes an interface 30, a processor 32, such as a computing machine (e.g., a personal computer) with a memory 34, and a display 36 (e.g., a monitor). The processor 32 may execute instructions stored in firmware (not shown) and is programmed to perform operations and functions described herein. The processor 32 is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Additionally, the memory 34 is intended to represent one or more volatile and/or nonvolatile storage facilities, for example, solid state memory (e.g., random access memory (RAM), read-only memory (ROM), and flash memory), magnetic storage devices (e.g., floppy disks and hard disks), and/or optical storage devices (e.g., CD-ROM, CD-RW, and DVD). The memory 34 may be internal to or external from the processor 32.

In use, the object 22 is mounted on the fixture of holder (not shown) to secure the object 22 in place during inspection, such that the probe 26 performs an ultrasound scan of the object 22 using any suitable technique. For example, in one embodiment, the probe 26 includes a single element transducer and performs 30-40 B-mode scans (also referred to as B-scans) of the object 22 over a particular region or area to acquire B-scan images. The probe 26 then may be controlled to perform one or more additional sets of B-scans to acquire one or more sets of B-scan images at other regions or areas of the object 22. The multiple sets of scans may be performed in determined/defined locations or may be randomly selected. In the illustrated embodiment, the manipulator 28 is a six-axis manipulator allowing scanning of the object 22 along different axis and at different view angles.

Electrical signals generated by the probe 26 (e.g., pulse echoes) are received by the data acquisition/control system 24 over a data communication link 38 through the interface 30 and are stored in the memory 34. The processor 32 is also coupled to the manipulator 28 by the communication link 38 to facilitate controlling the scanning of the object 22. It should be noted that in some embodiments the processor 32 may be coupled to the manipulator 28 using a different communication link (not shown). A user input 39 (e.g., a keyboard) is coupled to the processor 32 to provide operator control of the inspection of the object 22. In one embodiment, one or more peripheral devices, for example, a printer (not shown) may be provided to generate hard copies of the images or reports generated by the processor 32.

In various embodiments, the inspection system 20 provides automated inspection of, for example, composite parts, using ultrasound images, to detect and identify anomalies. In one embodiment, the images are ultrasound B-scans acquired by the probe 26, which may be controlled by the manipulator 28 (e.g., robotic manipulator), which scans in a raster pattern over the surface of the object 22 being inspected. Various embodiments also provide image processing algorithms that may be executed by the processor 32 to analyze the images to identify features indicative of internal part structures as well as defects, such as manufacturing defects. It should be noted that the images may be acquired using any suitable image acquisition process.

Figure 3:
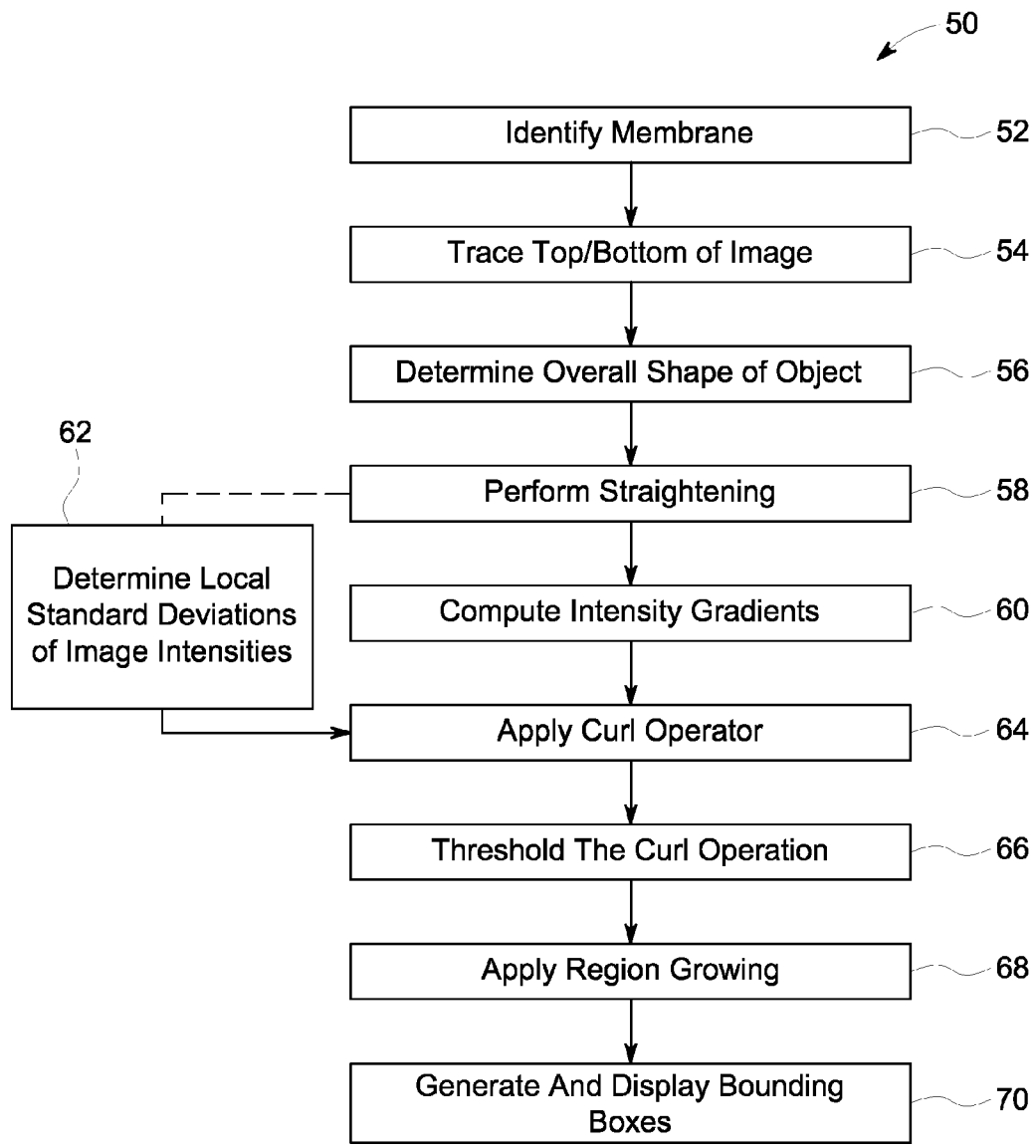
FIG. 3 is a flowchart of a method of determining anomalies in images in accordance with various embodiments.

In accordance with various embodiments, ultrasound images are automatically analyzed to determine anomalies in the object 22, such as using the method 50 shown in FIG. 3. It should be noted that although the method 50 is described in connection with identifying anomalies in composite structure, in particular a composite propeller, the method 50 may be used in connection with the inspection of other objects 22 or parts.

Figure 4:
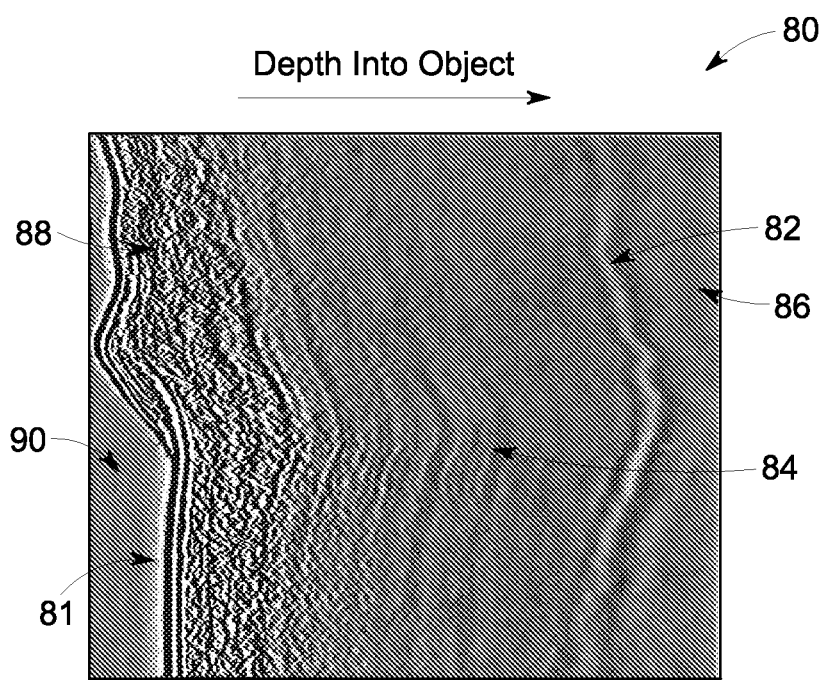
FIG. 4 is an ultrasound image that may be processed in accordance with various embodiments to identify anomalies.

The method 50 is performed on one or more sets of ultrasound B-scan images to identify, for example, important internal structures and anomalies (e.g., potential manufacturing defects). For example, FIG. 4 illustrates an exemplary ultrasound image 80, wherein the surface part 81 of the ultrasound image 80 is to the left. The ultrasound image 80 is of a portion of a composite propeller blade.

The method 80 includes identifying a membrane of the object at 52. For example, as shown in FIG. 3, the membrane 82 is defined by a membrane layer, which in the composite structure separates the composite material defined by carbon composite layers 84 from an inner material 86. The various embodiments identify the membrane 82, which can contain defects and the characteristics of which can be indicative of other internal defects, such as wrinkles as described in more detail below. It should be noted that under normal conditions the membrane 82 is indicative of the overall expected shape, and hence, gradient flow in the ultrasound image 80.

It also should be noted that the ultrasound image 80 represents a carbon composite structure, such as for a propeller blade that includes a fiberglass braiding 88 over the top surface of the propeller blade. Additionally, water 90 on the top surface may also be imaged. It further should be noted that the structure forming the fiberglass braiding 88 is different from the internal structure of the object, namely the propeller blade, and is ignored during the image analysis described herein to identify anomalies.

In various embodiments, to identify the membrane 82, a three-dimensional (3D) approach is taken. In particular, in one embodiment, a graph-based shortest-path method is employed for the membrane segmentation with shape prior information, a surface distance penalty and detected signal information, which indicates the presence of the membrane 82.

For example, in one embodiment, a cost function may be used that contains contributions from a shape prior and a detected signal that indicates the presence of the membrane 82. The cost function for finding the membrane 82 may be defined as follows:

$$C(S) = C_{intensity}(S) + \sum_{S_{adj}} (S - S_{adj})^2 + (S - S_{model})^2 \qquad \text{Eq. 1}$$

In Equation 1, the first term $C_{Intensity}(S)$ measures how well a current detection S fits a given intensity model of the membrane 82. For example, this term defines the difference for a value of a sinusoidal period (from peak to peak) for a current period and a reference period for the membrane 82. The reference period may be determined, for example, empirically. The second term penalizes the distance between the current detection S and the membrane $S_{adj}$ in adjacent scans. Thus, this term is a shape constraint between adjacent images to determine any deviation. Thus, the cost function is summed over an image and immediately adjacent neighbor images (e.g., in a set of 30-40 images) such that the summing is performed over a three-dimensional area. It should be noted that adjacent images are coarsely aligned due to the scanning technique described herein, namely a raster scan pattern in one embodiment, and that the membrane 82 may be easier to detect in some images than in others. In various embodiments, the membrane 82 is identified by optimizing the cost function that assesses fitness to a model (e.g., an intensity model, smoothness model or shape model, among others) and/or agreement with the image data. Thus, $C_{Intensity}(S)$ in various embodiments is a measure of the fitness of a first or current membrane detection S with respect to a defined intensity model of the membrane.

The third term, which is optionally included, penalizes the shape change between the current detection S and the prior shape model $S_{model}$. This term represents any deviation from the model term that represents a non-defective membrane, namely what the membrane 82 should look like in the image. The cost function uses features of the membrane 82 to define an energy function in various embodiments, wherein the period defines the function. Thus, the cost function generally defines an intensity for each image and a shape constraint.

In various embodiments, C(S) is calculated such that C(S) minimizes or reduces within a defined limit the total cost on all images. Thus, the membrane layer, and in particular the location and shape of the membrane layer, for example, the membrane 82 is determined in various embodiments using a global cost function that is applied to a set of images.

Thereafter, with the membrane layer detected, a warping may be applied to the image to remove the effects of large scale variations in the image that result from scanning geometries. In particular, the top and bottom of the image are traced at 54 such that an overall shape of the object is determined at 56 by the profiles of these traces. It should be noted that in one embodiment a low pass filter may be applied to the membrane 82 such that the curve representing the membrane 82 varies smoothly. The filtering may be adjusted based on a required or desired amount of smoothing.

Thereafter, in one embodiment, warping is applied by performing a straightening operation at 58 that effectively straightens the membrane 82. For example, the non-linearity of the membrane 82 is removed by shifting all rows in the image 80 (e.g., shifting pixels in each row) from the top to bottom of the image 80 so as to straighten the membrane that has been traced. For example, a node may be selected at the top and bottom of the image 80 with the pixels aligned therebetween. Thus, a rectification process is performed to remove large scale variations in the image 80 using a reference structure, for example, to identify an abnormal undulation in an image compared to an image of a normal structure (e.g., that is a baseline for normal). It should be noted that the reference structure may be, for example, any portion of an object, such as a front surface of the object (instead of the membrane 82) or a boundary of a fiberglass layer.

Thereafter, once the image 80 is warped, intensity gradients are computed at 60, which includes determining the magnitude and orientation of the intensity gradients. In various embodiments, a multi-scale process is performed that results in image gradient orientations that contain noise on a scale that is smaller than any anomalies or defects of interest. In various embodiments, a regularization operation is applied to the gradient vector field across the image as described in more detail below.

In particular, once the image 80 is warped, intensity gradients and orientations for the intensity gradients are calculated, for example, on the image at ½ and ¼ scale. However, these values may be changed depending on the application. The calculations may be performed using any suitable gradient calculation process. A regularization operation is applied to impose order on the gradients that aligns the gradients while not removing any anomalies. In one embodiment, the regularization parameters or constraints are determined empirically.

Figure 5:
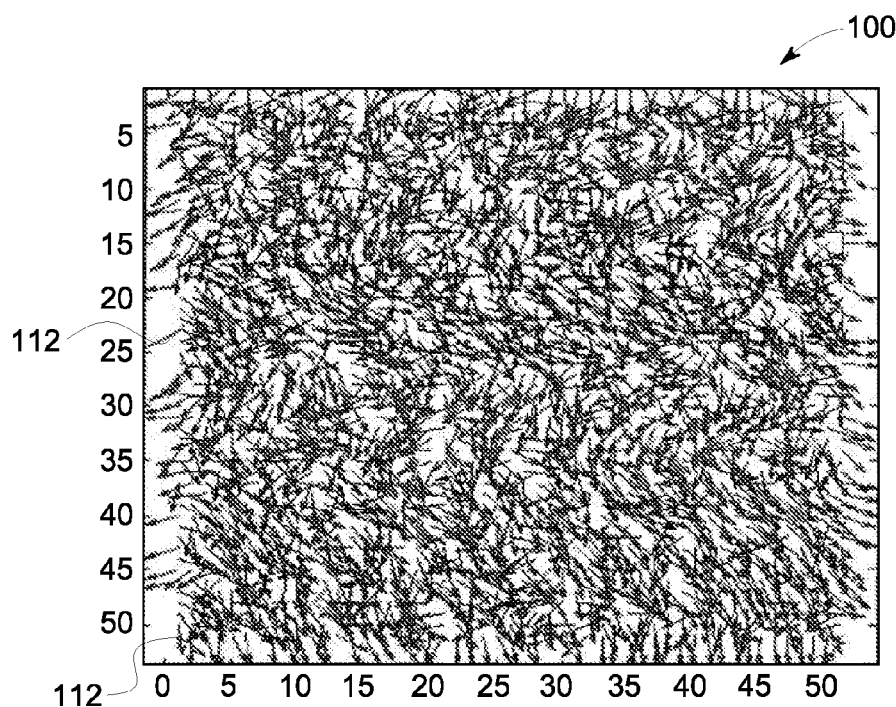
FIG. 5 is a graph showing a gradient vector field calculated in accordance with various embodiments.
Figure 6:
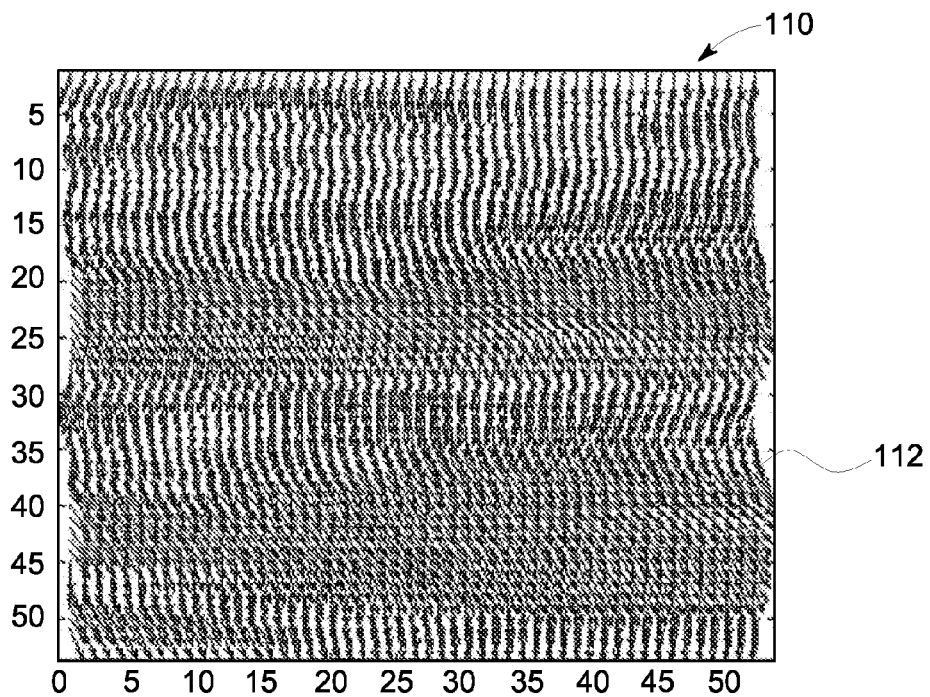
FIG. 6 is a graph illustrating the gradient vector field of FIG. 5 after regularization in accordance with various embodiments.

In various embodiments, the regularization of gradient orientations is weighted by the gradient magnitude to account for the strong correlation between the confidence of the gradient orientation and the gradient magnitude. It should be noted that the sampling of the image 80 may be non-isotropic such that the vertical and horizontal pixel dimensions are not the equal. Accordingly, regularization can be performed to account for the non-uniformity in image sampling. Thus, using a suitable regularization technique, which may include empirically determined constraints, gradients in the image 80 are realigned to account for non-uniformities. For example, FIG. 5 illustrates a graph 100 of gradients 102 (illustrating a gradient vector field) in a portion of the image before regularization and FIG. 6 illustrates a graph 110 of gradients 112 (illustrating a gradient vector field) in the portion of the image after regularization. As can be seen, the gradients are in a more aligned order in FIG. 6 than in FIG. 5, wherein the image non-uniformities cause random gradient orientations. It should be noted that ideally, namely in an image with no anomalies, the gradients 112 should be aligned linearly from top to bottom in the graph 110.

It also should be noted that image intensities in the region of the surface braiding, for example at the surface of the braiding 88, tend to be much more randomized than elsewhere in the image. Accordingly, using this difference, various embodiments identify the region between the surface braiding and the inner core, for example the inner material 86, such as the internal carbon composite layers. In particular and referring again to FIG. 3, at 62, local standard deviations of the image intensities are determined, which in various embodiments is performed concurrently (or simultaneously) with the straightening at 58. For example, a thresholding process may be performed wherein local standard deviations that exceed a threshold value are excluded as not part of the internal carbon composite layers. In one embodiment, the threshold value is empirically determined, such as based on previous inspections of a similar object. Thus, gradients or regions exceeding the defined threshold are excluded.

Figure 7:
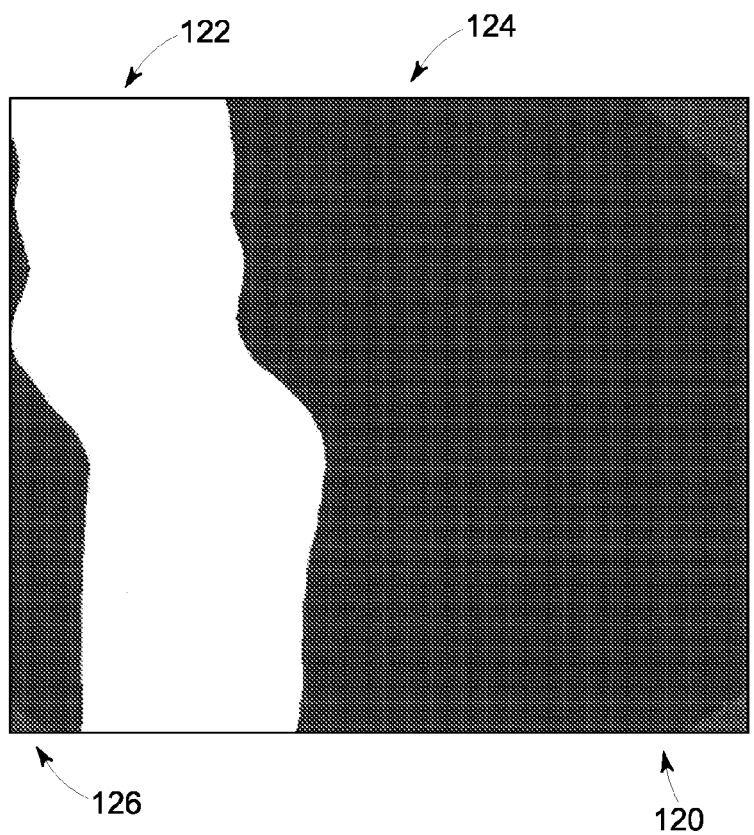
FIG. 7 is an image illustrating the results of a local standard deviation thresholding process in accordance with various embodiments.

In one embodiment, the local standard deviation of the image intensities is computed in small windows across the entire image. In this embodiment, any regions where the standard deviation exceeds the threshold limit are identified as belonging to the surface braiding region. The boundary between the surface braiding region and the internal carbon composite layers is represented as a contour tracing a line of constant standard deviation. Accordingly, this line provides an indication of the expected directional flow of gradients from the top to the bottom in the image 80. The results of step 62 are shown in the image 120 of FIG. 7 wherein the region 124 on the right side of the image is included such that the various embodiments process the data therein to identify any anomalies. However, the region 122 on the left side of the image 120 is excluded from further processing. Additionally, any areas 126 to the left of the region 122 are also excluded as these areas 126 are outside the object.

Thereafter, with the gradients regularized and the region of interest (e.g., composite area of the structure), namely the region 124 identified, and the local standard deviations determined, anomalies (e.g., wrinkles) may be identified, which in one embodiment includes applying a curl operator at 64. Applying the curl operator gives a measure of the circular motion of a vector field, which in various embodiments includes computing the local curl of the gradient vector field. For example, in one embodiment, a small window is scanned over the image and the curl is computed in the window. The result of applying the curl operator is a scalar value computed on a vector field that is indicative of the rotation of the field. The presence of anomalies, such as wrinkles in the composite structure, leads to a local rotation in the gradient vector field that is detected using the curl operator. Thus, the higher the scalar value resulting from the application of the curl operator, the greater the likelihood of an anomaly.

Figure 8:
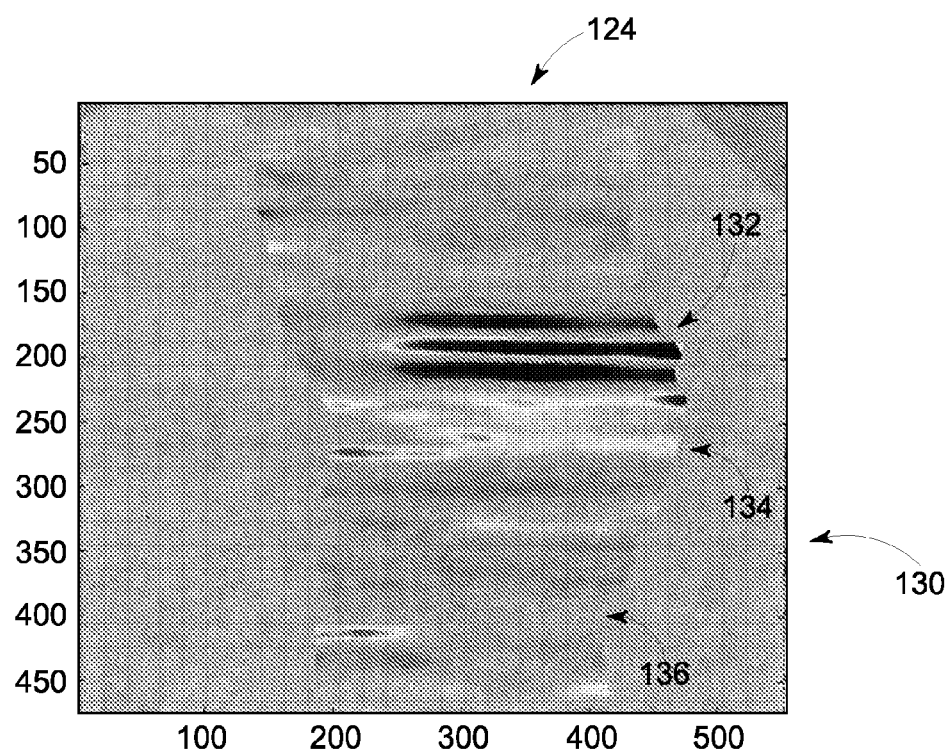
FIG. 8 is a graph illustrating local curl values of a gradient vector field in accordance with various embodiments.

The application of the curl operator results in a graph 130 as shown in FIG. 8 wherein the scalar values are determined in the region 124. In the exemplary graph 130, different scalar values or ranges of scalar values are indicated by different shades of darkness (e.g., grayscale). For example, the area 132 includes darker portions than the area 134 indicating that the scalar values are higher in the area 132. It should be noted that instead of using different shades (or levels) of darkness, different colors may be used to indicate values, such as green where there is no curl (such as in area 136) and then in increasing value from yellow to blue to red with optionally different shades or brightness of colors. In general, the results of step 64 are different scalar values for curl in different regions of the image.

Thereafter, a thresholding is performed at 66 on the results of the curl operation. For example, one or more threshold values may be defined to determine whether a value is an anomaly (e.g., a wrinkle) or not. In some embodiments, different threshold values may be used to indicate different levels of confidence that the area includes a particular anomaly. Thus, by applying a threshold to the determined curl values, one or more anomalies may be identified. The threshold values again may be determined empirically.

Thus, once the value of the curl is computed across the image a threshold may be applied to the values to determine where anomalies are located. In one embodiment, the thresholding result forms a binary image to which any suitable image processing technique may be applied. For example, a connected components analysis and segmentation can be applied to localize and measure anomaly regions (e.g., defect regions).

Figure 9:
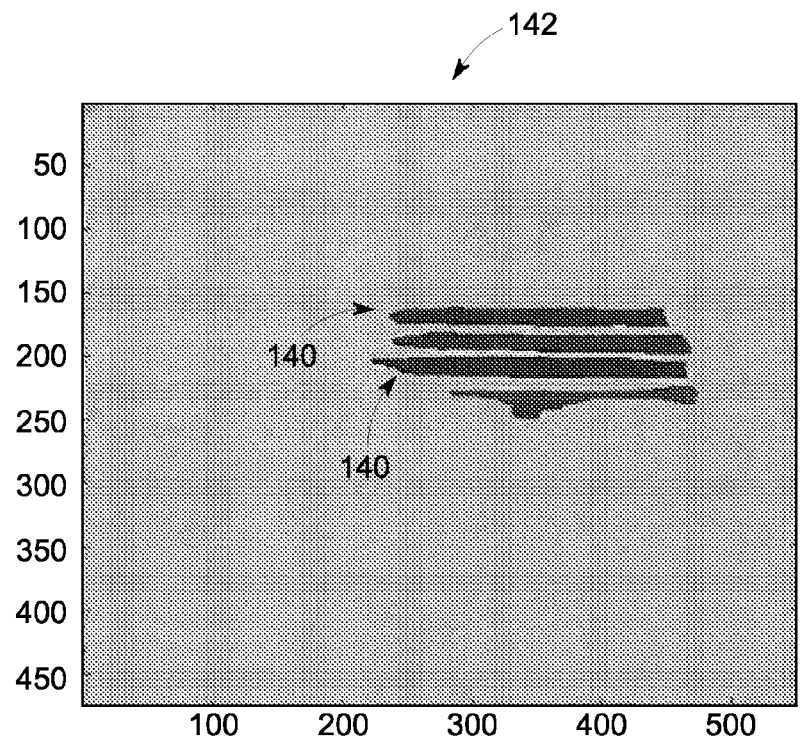
FIG. 9 is a graph illustrating the results of a threshold and growing process in accordance with various embodiments.
Figure 10:
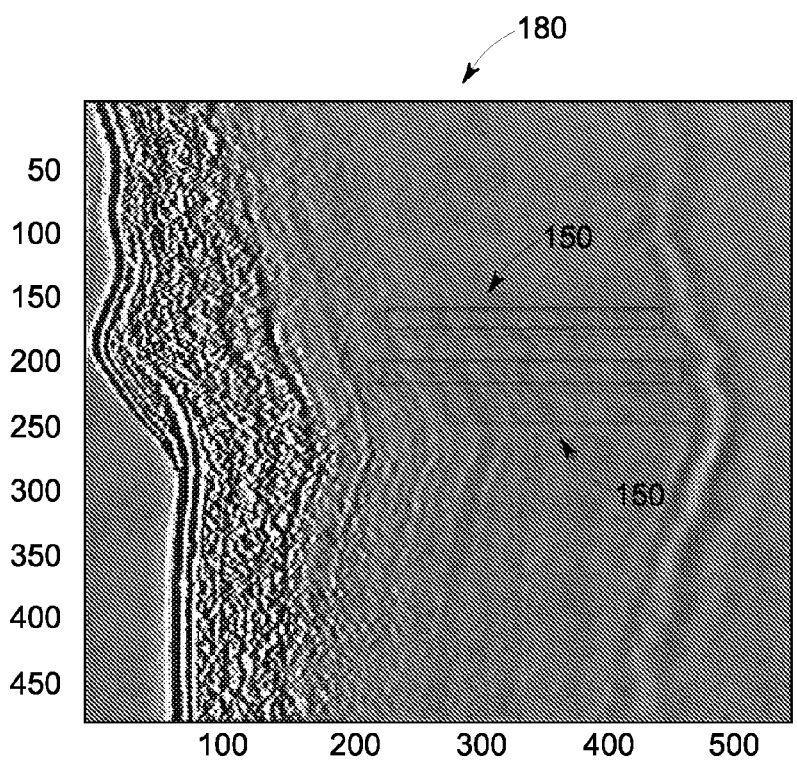
FIG. 10 is the ultrasound image of FIG. 4 showing anomaly regions identified in accordance with various embodiments.

In one embodiment, regions of high response in the curl computation, namely areas that include high values, are used to seed a region growing algorithm to identify anomaly regions. For example, region growing (e.g., a region growing algorithm or process) is applied at 68 such that regions having values above the threshold are grown by a defined number of pixels such that anomaly regions 140 are identified as illustrated in the graph 142 of FIG. 9. As can be seen, in this exemplary embodiment, as a result of the thresholding and region growing, four anomaly regions 140 are identified. Based on the identified anomaly regions 140 corresponding overlays may be provided on the image 80. For example, in one embodiment and referring again to FIG. 3, bounding boxes 150 may be generated and displayed at 70, such as shown in FIG. 10. It should be noted that the bounding boxes 150 are defined by the anomaly regions 140, but are expanded to form rectangular boxes in FIG. 10, such as may be slightly larger than the anomaly regions 140. Additionally, the bounding boxes 150 may be colored or shaded corresponding to the determined level of the curl values within each of the bounding boxes 150 (e.g., darker or different colors for higher average threshold values).

It should be noted that the various embodiments, including one or more steps of the method 50 may be performed in two-dimensions and/or three-dimensions. For example, in one embodiment, the gradient vector field analysis (namely the gradient regularization and curl) is performed in two-dimensions, but the final curl segmentation is performed in three-dimensions.

Thus, various embodiments provide an automatic detection or determination of anomalies in ultrasound images, such as for inspection of industrial components. In at least one embodiment, areas corresponding to the detected anomalies may be visually identified to a user.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive, optical disk drive, and the like. The storage device may also be other similar means for loading computer programs or other instructions into the computer or processor.

As used herein, the term "computer" or "module" may include any processor-based or microprocessor-based system including systems using microcontrollers, Reduced Instruction Set Computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A non-transitory computer readable storage medium for Identifying anomalies in an object that is imaged using at least one processor, the non-transitory Computer readable storage medium including instructions to command the processor to:
    obtain a plurality of images corresponding to at least one area of an object;
    perform a rectification of at least some of the plurality of images using a reference structure; and
    perform a gradient vector field analysis on the rectified plurality of images of the object to identify anomaly regions within the object, wherein the object includes a membrane and the instructions command the processor to identify the membrane using a model of the membrane, the membrane is identified in the plurality of images by optimizing a cost function that assesses fitness to at least one of the model or agreement with image data, and the cost function is defined as:

$$C(S) = C_{intensity}(S) + \sum_{S_{adj}} (S - S_{adj})^2 + ([S - S_{model}])^2$$

wherein $C_{Intensity}(S)$ is a measure of the fitness of a first or a current membrane detection S with respect to a defined intensity model of the membrane, $S_{adj}$ is a current membrane detection in adjacent images and $S_{model}$ is a prior shape model.

2. The non-transitory computer readable storage medium of claim 1, wherein the plurality of images are adjacent ultrasound images acquired using a B-mode scan of the object.

3. The non-transitory computer readable storage medium of claim 1, wherein the instructions command the processor to use a spatial filter to determine the overall shape of the object and compensate for the overall shape of the object by straightening the plurality of images, the straightening including shifting a plurality of rows of pixels in the plurality of images.

4. The non-transitory computer readable storage medium of claim 1, wherein the model includes at least one of an intensity model, a smoothness model, and a shape model.

5. The non-transitory computer readable storage medium of claim 1, wherein the instructions command the processor to perform the gradient vector field analysis by calculating magnitudes and orientations of the intensity gradients.

6. The non-transitory computer readable storage medium of claim 5, wherein the calculation of intensities and orientation is performed using a multi-scale process.

7. The non-transitory computer readable storage medium of claim 1, wherein the instructions command the processor to perform a regularization to a gradient field across the plurality of images.

8. The non-transitory computer readable storage medium of claim 7, wherein the instructions command the processor to use weighted gradient orientations to perform the regularization.

9. The non-transitory computer readable storage medium of claim 7, wherein the instructions command the processor to determine values for local standard deviations of image intensities and threshold the values to identify a region of interest in the plurality of images.

10. The non-transitory computer readable storage medium of claim 7, wherein the instructions command the processor to use a curl operator to determine a plurality of curl values for the regularized gradient vector field.

11. The non-transitory computer readable storage medium of claim 10, wherein the instructions command the processor to threshold a plurality of curl values determined using the curl operator to identify the anomaly regions.

12. The non-transitory computer readable storage medium of claim 11, wherein the instructions command the processor to apply a region growing process to the identified anomaly regions.

13. The non-transitory computer readable storage medium of claim 1, wherein the instructions command the processor to display on at least one of the plurality of images an overlay identifying at least one anomaly region.

14. The non-transitory computer readable storage medium of claim 13, wherein the instructions command the processor to indicate a confidence level of an anomaly within the overlay.

15. An inspection system comprising:
a processor configured to perform a rectification of at least some of a plurality of images of an object using a reference structure and to perform a gradient vector field analysis on the rectified images of the object to identify anomaly regions within the object; and
a display configured to display at least one of the images with any identified anomaly regions on the displayed image, wherein the object is a propeller blade that includes an internal membrane and the processor is further configured to identify the membrane using a global cost function summed across the plurality of images, wherein the global cost function is defined as:

$$C(S) = C_{intensity}(S) + \sum_{S_{adj}} (S - S_{adj})^2 + ([S - S_{model}])^2$$

wherein $C_{Intensity}(S)$ is a measure of a fitness of a first or a current membrane detection S with respect to a defined intensity model of the membrane, $S_{adj}$ is a current membrane detection in adjacent images and $S_{model}$ is a prior shape model.

16. The inspection system of claim 15, wherein the processor is further configured to use a spatial filter to determine an overall shape of the object and compensate for the overall shape of the object by straightening the plurality of images, the straightening including shifting a plurality of rows of pixels in the plurality of images.

17. The inspection system of claim 15, wherein the processor is further configured (i) to perform a regularization to a gradient field across the plurality of images using weighted gradient orientations and (ii) to determine values for local standard deviations of image intensities and threshold the values to identify a region of interest in the plurality of images, the processor additionally configured to use a curl operator to determine a plurality of curl values for the regularized gradient vector field and threshold a plurality of curl values determined using the curl operator to identify the anomaly region.

18. The inspection system of claim 15, wherein the processor is further configured to apply a region growing process to the identified anomaly region and display on at least one of the plurality of images an overlay identifying the anomaly region.

19. A method for automatically identifying anomalies in images of an object having an internal membrane, the method comprising:
identifying the internal membrane in a plurality of images of the object;
determining an overall shape of the object;
warping the overall shape in the images to straighten the object;
determining local standard deviations of image intensities to identify material types within the object;
computing and regularizing intensity gradients across a region of interest within the plurality of images to determine a gradient vector field;
applying a curl operator to the gradient vector field;
thresholding a result of the curl operator to determine any anomaly region;
applying a region growing process to any anomaly region; and
generating and displaying an overlay on at least one of the plurality of images identifying any anomaly region.

* * * * *